(12) United States Patent
Kanagawa et al.

(10) Patent No.: US 11,545,135 B2
(45) Date of Patent: Jan. 3, 2023

(54) ACOUSTIC MODEL LEARNING DEVICE, VOICE SYNTHESIS DEVICE, AND PROGRAM

(71) Applicant: NIPPON TELEGRAPH AND TELEPHONE CORPORATION, Tokyo (JP)

(72) Inventors: Hiroki Kanagawa, Musashino (JP); Yusuke Ijima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/275,268

(22) PCT Filed: Sep. 25, 2019

(86) PCT No.: PCT/JP2019/037620
§ 371 (c)(1),
(2) Date: Mar. 11, 2021

(87) PCT Pub. No.: WO2020/071213
PCT Pub. Date: Apr. 9, 2020

(65) Prior Publication Data
US 2022/0051655 A1 Feb. 17, 2022

(30) Foreign Application Priority Data
Oct. 5, 2018 (JP) .............................. JP2018-190462

(51) Int. Cl.
*G10L 17/00* (2013.01)
*G10L 25/51* (2013.01)
(Continued)

(52) U.S. Cl.
CPC ............. *G10L 13/10* (2013.01); *G06N 3/0454* (2013.01); *G10L 25/30* (2013.01); *G10L 25/63* (2013.01); *G10L 25/78* (2013.01)

(58) Field of Classification Search
CPC ........ G10L 13/04; G10L 13/047; G10L 13/10
See application file for complete search history.

(56) References Cited

U.S. PATENT DOCUMENTS

2006/0229874 A1 10/2006 Kaneyasu

FOREIGN PATENT DOCUMENTS

CN 108615524 A * 10/2018 ............. G10L 13/04
CN 104112444 B * 11/2018
(Continued)

OTHER PUBLICATIONS

Dec. 17, 2019, International Search Report issued in the International Patent Application No. PCT/JP2019/037620.
(Continued)

*Primary Examiner* — Shreyans A Patel
(74) *Attorney, Agent, or Firm* — Kenja IP Law PC

(57) ABSTRACT

An acoustic model learning device is provided for obtaining an acoustic model used to synthesize voice signals with intonation. The device includes a first learning unit that learns the acoustic model to estimate synthetic acoustic feature values using voice and speaker determination models based on acoustic feature values of speakers, language feature values corresponding to the acoustic feature values and speaker data items, a second learning unit that learns the voice determination model to determine whether the synthetic acoustic feature value is a predetermined acoustic feature value or not based on the acoustic feature values and the synthetic acoustic feature values, and a third learning unit that learns the speaker determination model to determine whether the speaker of the synthetic acoustic feature
(Continued)

value is a predetermined speaker or not based on the acoustic feature values and the synthetic acoustic feature values.

20 Claims, 6 Drawing Sheets

(51) Int. Cl.
  *G10L 25/18* (2013.01)
  *G10L 13/10* (2013.01)
  *G06N 3/04* (2006.01)
  *G10L 25/30* (2013.01)
  *G10L 25/63* (2013.01)
  *G10L 25/78* (2013.01)

(56) References Cited

FOREIGN PATENT DOCUMENTS

| CN | 107945786 B | * | 5/2021 | ........... G10L 13/047 |
| JP | 2006293026 A | | 10/2006 | |
| JP | 2017032839 A | | 2/2017 | |
| KR | 20200015154 A | * | 2/2020 | ............. G10L 17/00 |
| WO | WO-2019044401 A | * | 3/2019 | ............. G10L 13/10 |

OTHER PUBLICATIONS

Ian J. Goodfellow et al., Generative Adversarial Nets, Neural Information Processing Systems, 2014, pp. 2672-2680.

Takayoshi Yoshimura et al., Incorporation of Mixed Excitation Model and Postfilter into HMM-Based Text-to-Speech Synthesis, Journal of the Institute of Electronics, Information and Communication Engineers, Aug. 2004, pp. 1565-1571, vol. J87-D-II, No. 8.

Tomoki Toda et al., A Speech Parameter Generation Algorithm Considering Global Variance for HMM-Based Speech Synthesis, IEICE Transactions on Information and Systems, May 2007, pp. 816-824, vol. E90-D, No. 5.

Yuki Saito et al., Training Algorithm To Deceive Anti-Spoofing Verification for DNN-Based Speech Synthesis, International Conference on Acoustics, Speech and Signal Processing, 2017, pp. 4900-4904, Institute of Electrical and Electronics Engineers.

* cited by examiner

ACOUSTIC MODEL LEARNING DEVICE, VOICE SYNTHESIS DEVICE, AND PROGRAM

TECHNICAL FIELD

The present invention relates to an acoustic model learning device, a voice synthesis device and a program.

BACKGROUND ART

Conventionally, voice synthesis devices are known, which learn an acoustic model according to a DNN (deep neural network) using a plurality of acoustic feature values extracted from natural voice data of a plurality of speakers, a plurality of language feature values extracted from a plurality of text data items corresponding to the natural voice data of the plurality of speakers and a plurality of speaker data items or the like as learning data, and generate synthetic voice data of a target speaker from arbitrary text data (see FIG. 5). For example, Patent Literature 1 discloses a voice synthesis device that learns a DNN acoustic model at low cost by efficiently using natural voice data of a plurality of speakers.

The above-described DNN acoustic model is constructed so as to minimize a mean squared error (MSE) between an acoustic feature value based on natural voice data and a synthetic acoustic feature value estimated from a DNN acoustic model as shown in following Formula (1).

[Formula 1]
Mean Squared Error:

$$MSE(o, \hat{o}) = \frac{1}{T}\sum_{t=1}^{T}(o_t - \hat{o}_t)^2 \quad (1)$$

Where, $l_1, \ldots, l_T$ are language feature values, $s_1, \ldots, s_T$ are speaker codes, $o_1, \ldots, o_T$ are acoustic feature values, $\hat{o}_1, \ldots, \hat{o}_T$ ($\hat{o}_t = G(l_L, s_L)$) are synthetic acoustic feature values, t is a frame index and T is a total number of frames.

However, the above-described DNN acoustic model excessively smooths the synthetic acoustic feature value, and so synthetic voice data generated by a voice synthesis unit tends to lose natural voice feeling. Various techniques are proposed as measures against this, such as signal-processing-like approach (see Non-Patent Literature 1) using a post-filter or the like, generation of parameters in consideration of in-sequence fluctuation during voice synthesis (see Non-Patent Literature 2) or the like, but it can be said that such techniques are insufficient to reproduce the acoustic feature value obtained from natural voice data.

Therefore, development of a voice synthesis device (see Non-Patent Literature 4) is in progress which alternately learns an acoustic model and a determination model via a generative adversarial network (GAN) (see Non-Patent Literature 3) using an acoustic feature value extracted from natural voice data of a single speaker and a language feature value extracted from text data corresponding to the natural voice data of the single speaker or the like as learning data (see FIG. 6).

The acoustic model via the generative adversarial network is constructed so as to bring the synthetic acoustic feature value estimated by the acoustic model closer to the acoustic feature value based on the natural voice data, that is, so as to minimize a loss function of the natural/synthetic voice determination model shown in following Formula (2) and a loss function of the acoustic model shown in following Formula (3).

[Formula 2]
Loss Function of Natural/Synthetic Voice Determination Model:

$$L_{D_{ASV}}(o, \hat{o}) = L_{ASV,1}(o) + L_{ASV,0}(\hat{o}) \quad (2)$$

$$L_{ASV,1}(o) = -\frac{1}{T}\sum_{t=1}^{T}\ln D_{ASV}(o_t)$$

$$L_{ASV,0}(\hat{o}) = -\frac{1}{T}\sum_{t=1}^{T}\ln(1 - D_{ASV}(\hat{o}_t))$$

[Formula 3]
Loss Function of Acoustic Model:

$$L_G(o, \hat{o}) = MSE(o, \hat{o}) + w_D \frac{E_{MSE}}{E_{ASV}} L_{ASV,1}(\hat{o}) \quad (3)$$

Where, are language feature values, $s_1, \ldots, s_T$ are speaker codes, $o_1, \ldots, o_T$ are acoustic feature values, $\hat{o}_1, \ldots, \hat{o}_T$, ($\hat{o}_t = G(l_t)$) are synthetic acoustic feature values, t is a frame index and T is a total number of frames, $w_D$ is a hyper parameter of adversarial learning, $E_{MSE}$ and $E_{ASV}$ are expected values of learning 1 iteration of MSE(o, ô) and $L_{ASV,1}(\hat{o})$ respectively.

CITATION LIST

Patent Literature

Patent Literature 1: Japanese Patent Laid-Open No. 2017-32839

Non-Patent Literature

Non-Patent Literature 1: Takayoshi. Yoshimura, Keiichi. Tokuda, Takashi. Masuko, Takao. Kobayashi, and Tadashi. Kitamura, "Incorporating a mixed excitation model and postfilter into HMM-based text-to-speech synthesis," IEICE Trans. on Information and Systems, vol. J87-D-II, no. 8, pp. 1563-1571, 2004.
Non-Patent Literature 2: Tomoki. Toda, Keiichi. Tokuda. A speech parameter generation algorithm considering global variance for HMM-based speech synthesis. IEICE Transactions, Vol. E90-D, No. 5, pp. 816-824, May 2007.
Non-Patent Literature 3: Ian J. Goodfellow, Jean Pouget-Abadie, Mehdi Mirza, Bing Xu, David Warde-Farley, Sherjil Ozair, Aaron, Courville, and Yoshua Bengio, "Generative adversarial nets," Proc. NIPS, pp. 2672-2680, 2014.
Non-Patent Literature 4: Yuki Saito, Shinnosuke Takamichi, and Hiroshi Saruwatari, "Training algorithm to deceive anti-spoofing verification for DNN-based speech synthesis," Proc. ICASSP, pp. 4900-4904, 2017.

SUMMARY OF THE INVENTION

Technical Problem

The synthetic voice generated using an acoustic model learned by a voice synthesis device using the natural voice data of the plurality of speakers shown in FIG. 5 as learning data is a voice similar to a so-called machine voice without intonation. Therefore, to make the user feel like a natural voice, it is necessary to apply separate processing such as post-filtering to the voice. For example, it is a general practice in navigation for automobiles these days that navigation is performed with a voice signal similar to a natural voice. Computation devices mounted on automobiles often do not have high performance and it may be difficult to apply the above-described processing every time a voice signal for navigation is emitted to a user.

Furthermore, when adversarial learning as shown in FIG. 6 is simply applied to the voice synthesis device using natural voice data of the plurality of speakers as shown in FIG. 5 as learning data, the model learning unit may learn the acoustic model and the determination model without determining the speakers. Especially when there are speakers having considerably different feature value distribution shapes among the learning speakers, the natural/synthesis determination device alone cannot consider speaker information, may be strongly influenced by the data, and cannot learn the acoustic model and the determination model appropriately. On the contrary, inappropriate learning may cause adversarial learning to deteriorate the synthetic voice.

The present invention has been implemented in view of such circumstances, and it is an object of the present invention to provide an acoustic model learning device, a voice synthesis device and a program capable of generating a high-quality synthetic voice.

Means for Solving the Problem

In order to solve the above-described problems, an acoustic model learning device according to the present invention is an acoustic model learning device for obtaining an acoustic model used to synthesize voice signals with intonation, including a first learning unit that learns the acoustic model to estimate a plurality of synthetic acoustic feature values using a voice determination model and a speaker determination model based on a plurality of acoustic feature values of a plurality of speakers, a plurality of language feature values corresponding to the plurality of acoustic feature values and a plurality of speaker data items, a second learning unit that learns the voice determination model to determine whether the synthetic acoustic feature value is a predetermined acoustic feature value or not based on the plurality of acoustic feature values and the plurality of synthetic acoustic feature values, and a third learning unit that learns the speaker determination model to determine whether the speaker of the synthetic acoustic feature value is a predetermined speaker or not based on the plurality of acoustic feature values and the plurality of synthetic acoustic feature values.

In order to solve the above-described problems, the voice synthesis device according to the present invention is a voice synthesis device that synthesizes voice data including features of a desired speaker, including a synthesis unit that synthesizes, from text data and speaker data representing the desired speaker, synthetic voice data, which is voice data corresponding to the text data and including the features of the desired speaker, in which the synthetic voice data is determined by a predetermined determiner to be a natural sound and a voice uttered by the desired speaker.

In order to solve the above-described problems, the acoustic model learning device according to the present invention is an acoustic model learning device for obtaining an acoustic model used to synthesize voice signals with intonation, including a first learning unit that learns the acoustic model to estimate a plurality of synthetic acoustic feature values using a voice determination model and an emotion determination model based on a plurality of acoustic feature values, a plurality of language feature values corresponding to the plurality of acoustic feature values and a plurality of emotion data items, a second learning unit that learns the voice determination model to determine whether the synthetic acoustic feature value is a predetermined acoustic feature value or not based on the plurality of acoustic feature values and the plurality of synthetic acoustic feature values, and a third learning unit that learns the emotion determination model to determine whether the emotion of the synthetic acoustic feature value is an acoustic feature value representing a predetermined emotion or not based on the plurality of acoustic feature values and the plurality of synthetic acoustic feature values.

In order to solve the above-described problems, a program according to the present invention causes a computer to function as the above-described acoustic model learning device.

Effects of the Invention

According to the present invention, a high-quality synthetic voice can be generated.

DESCRIPTION OF EMBODIMENTS

Hereinafter, embodiments of the present invention will be described in detail with reference to the accompanying drawings.

First Embodiment

Figure 1:
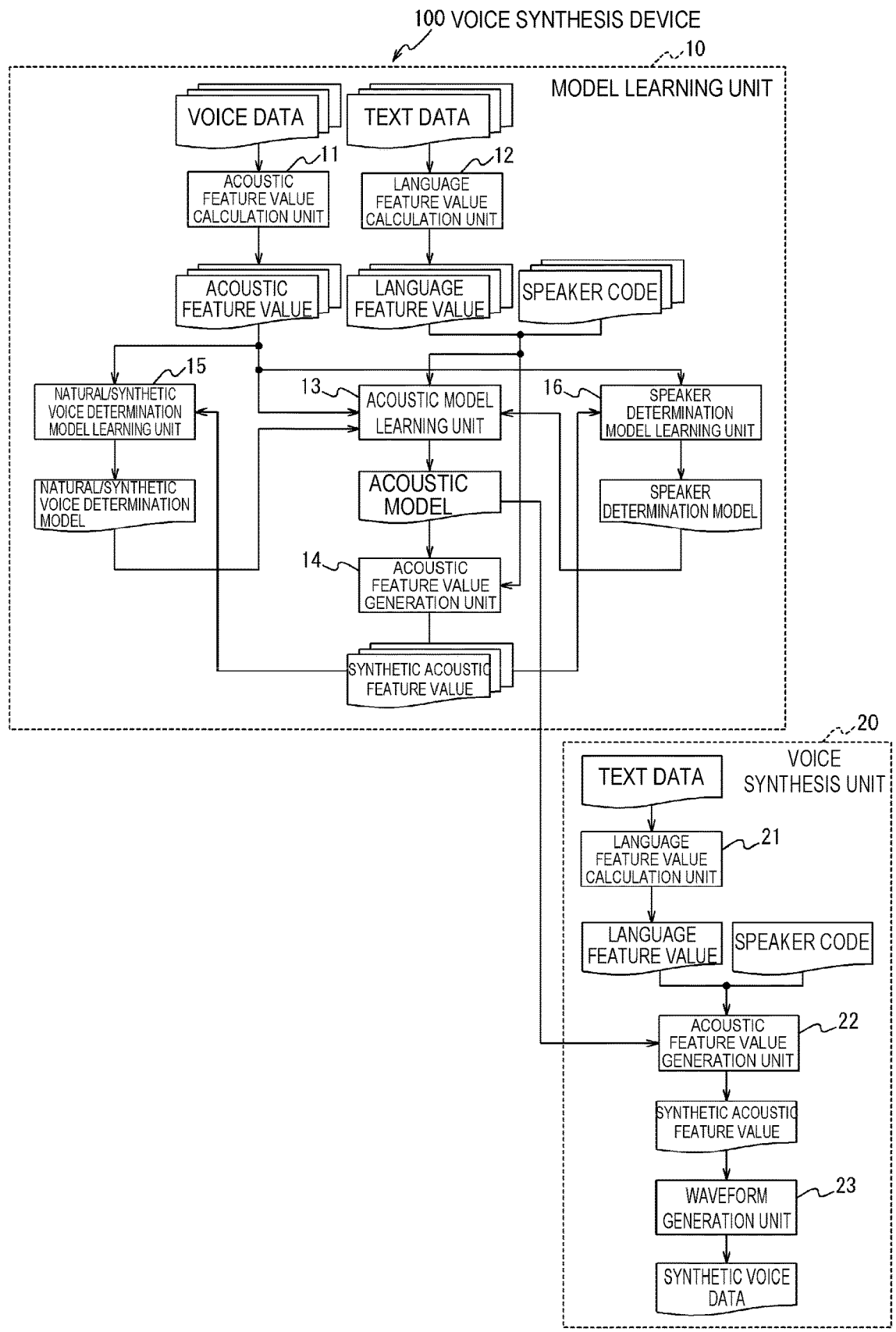
FIG. 1 is a block diagram illustrating an example of a configuration of a voice synthesis device according to a first embodiment of the present invention.

A voice synthesis device 100 according to a first embodiment will be described with reference to FIG. 1. FIG. 1 is a diagram illustrating an example of a configuration of the voice synthesis device 100 according to the first embodiment.

When the aforementioned acoustic model in which no speaker can be determined is used, appropriate learning is not performed, and as a result, a more deteriorated voice signal than when no adversarial learning is performed is synthesized conversely. For this reason, of an acoustic model and a determination model made to learn so as to identify a speaker as well, using the acoustic model makes it possible to stably perform adversarial learning even when there is a significant difference in a feature value distribution of a learning speaker and synthesize voice signals with natural voice feeling as originally intended.

As shown in FIG. 1, the voice synthesis device 100 is provided with a model learning unit 10 and a voice synthesis unit 20. The model learning unit 10 alternately learns the acoustic model and the determination model using a generative adversarial network (GAN) using natural voice data of a plurality of speakers, a plurality of text data items corresponding to the natural voice data of the plurality of speakers, a plurality of speaker data items or the like as learning data. The voice synthesis unit 20 generates synthetic voice data of a target speaker (speaker for whom synthetic voice data is generated) from arbitrary text data using the acoustic model.

The "natural voice" herein means a natural voice uttered by a speaker and the "synthetic voice" means an artificial voice generated by the voice synthesis unit 20. The "acoustic feature value" herein means an acoustic feature value based on natural voice data and the "synthetic acoustic feature value" means an acoustic feature value estimated from the acoustic model.

[Configuration of Model Learning Unit]

First, the model learning unit 10 will be described. The model learning unit 10 is provided with an acoustic feature value calculation unit 11, a language feature value calculation unit 12, an acoustic model learning unit (first learning unit) 13, an acoustic feature value generation unit 14, a natural/synthetic voice determination model learning unit (second learning unit) 15, a speaker determination model learning unit (third learning unit) 16, a database (not shown) or the like.

The acoustic feature value calculation unit 11 calculates a plurality of acoustic feature values based on natural voice data (learning data) of a plurality of speakers. The acoustic feature value is represented by a vector and examples thereof include mel-cepstrum representing phoneme and voice timbre, fundamental frequency representing a voice height, aperiodicity index representing a hoarseness level. For example, the acoustic feature value calculation unit 11 extracts an acoustic feature value for each frame set in advance from natural voice data of the plurality of speakers and stores the acoustic feature value together with the speaker data indicating to which speaker the acoustic feature value corresponds in a database.

The language feature value calculation unit 12 calculates a plurality of language feature values based on a plurality of text data items (learning data) corresponding to the natural voice data of the plurality of speakers. The language feature value is represented by a vector and examples thereof include phoneme, accent and mora length. For example, the language feature value calculation unit 12 applies text analysis processing such as morpheme analysis to the plurality of text data items, extracts a language feature value and stores the language feature value in the database.

Using a determination model (e.g., natural/synthetic voice determination model, speaker determination model), the acoustic model learning unit 13 learns an acoustic model that estimates a plurality of synthetic acoustic feature values using a plurality of acoustic feature values stored in the database, a plurality of language feature values stored in the database and a plurality of speaker data items stored in the database as learning data. The speaker data is represented by a vector and one example thereof is a speaker code. The speaker code can be represented by a K (=the number of speakers) dimensional vector in which a certain element is expressed by 1 and another element is expressed by 0.

The acoustic model learning unit 13 learns the acoustic model such that the synthetic acoustic feature value is brought closer to the acoustic feature value of a predetermined speaker (for example, any one of the above-described plurality of speakers for whom synthetic acoustic feature values are generated), that is, so as to minimize a loss function of the acoustic model shown in following Formula (4). The acoustic model learning unit 13 learns the acoustic model so as to arrogate the determination model.

[Formula 4]

Loss Function of Acoustic Model:

$$L'_G(o, \hat{o}) = MSE(o, \hat{o}) + w_D \frac{E_{MSE}}{E_{ASV} + E_{SPK}} \{L_{ASV,1}(\hat{o}) + L_{SPK,1}(\hat{o})\} \quad (4)$$

Where, $I_1, \ldots, I_T$ are language feature values, $s_1, \ldots, s_T$ are speaker codes, $o_1, \ldots, o_T$ are acoustic feature values, $\hat{o}_1, \ldots, \hat{o}_T$ ($\hat{o}_t = G(1_t, s_t)$) are synthetic acoustic feature values, t is a frame index and T is a total number of frames, $w_D$ is a hyper parameter of adversarial learning, MSE (o, ô) is a loss function by a squared mean error (MSE), $L_{ASV,1}(\hat{o})$ is a loss function corresponding to a natural voice, $L_{SPK,1}(\hat{o})$ is a loss function corresponding to the fact that the speaker of the synthetic acoustic feature value is not determined to be a predetermined speaker. $E_{MSE}$, $E_{ASV}$ and $E_{SPK}$ are expected values of learning 1 iteration of MSE(o, ô), $L_{SPK,1}(\hat{o})$ and $L_{SPK,1}(\hat{o})$ respectively.

The acoustic feature value generation unit 14 generates a plurality of language feature values to be stored in the database using the acoustic model and a plurality of synthetic acoustic feature values based on the plurality of speaker data items to be stored in the database. The acoustic feature value generation unit 14 estimates the acoustic feature value corresponding to the language feature value and the speaker data using the language feature value and the speaker data. At this time, as ingenuity for generating a smooth voice with higher continuity, the acoustic feature value may also be changed from a static feature value having merely 1-frame information to a dynamic feature value having difference information before and after the frame. To actually synthesize voices, the dynamic feature value needs to be converted to the static feature value, and in such a case, an algorithm such as a maximum likelihood parameter generation (MLPG) based on the dynamic feature value can be used.

The natural/synthetic voice determination model learning unit 15 learns a natural/synthetic voice determination model that determines that the synthetic acoustic feature value is a predetermined acoustic feature value based on the plurality of acoustic feature values to be stored in the database and the plurality of synthetic acoustic feature values to be stored in the database. Here, the fact that the synthetic acoustic feature value is a predetermined acoustic feature value shows, for example, that when the synthetic acoustic feature value is included in a distribution of feature values based on the natural sound data, the determination result is false, that is, determined to be natural voice data.

The natural/synthetic voice determination model learning unit 15 learns the natural/synthetic voice determination model so as to minimize the loss function of the natural/synthetic voice determination model shown in following Formula (5). The natural/synthetic voice determination model learning unit 15 learns the natural/synthetic voice determination model so as to detect arrogation by the acoustic model. Following Formula (6) is a loss function corresponding to a natural voice and following Formula (7) is a loss function corresponding to a synthetic voice.

[Formula 5]
Loss Function of Natural/Synthetic Voice Determination Model:

$$L_{D_{ASV}}(o,\hat{o}) = L_{ASV,1}(o) + L_{ASV,0}(\hat{o}) \tag{5}$$

[Formula 6]
Loss Function Corresponding to Natural Voice:

$$L_{ASV,1}(o) = -\frac{1}{T}\sum_{t=1}^{T} \ln D_{ASV}(o_t) \tag{6}$$

[Formula 7]
Loss Function Corresponding to Synthetic Voice:

$$L_{ASV,0}(\hat{o}) = -\frac{1}{T}\sum_{t=1}^{T} \ln(1 - D_{ASV}(\hat{o}_t)) \tag{7}$$

Where, $I_1, \ldots, I_T$ are language feature values, $s_1, \ldots, s_T$ are speaker codes, $o_1, \ldots, o_T$ are acoustic feature values, $\hat{o}_1, \ldots, \hat{o}_T$ ($\hat{o}_t = G(1_t, s_t)$) are synthetic acoustic feature values, t is a frame index and T is a total number of frames.

In the generative adversarial network, the model learning unit 10 learns the acoustic model so that the synthetic acoustic feature value is not determined by the natural/synthetic voice determination model to be a synthesized voice, and therefore "true" means that the synthetic acoustic feature value is not determined by the natural/synthetic voice determination model and "false" means that the synthetic acoustic feature value is determined by the natural/synthetic voice determination model.

Therefore, the natural/synthetic voice determination model determines the synthetic acoustic feature value by assuming that the synthetic acoustic feature value generated by the acoustic feature value generation unit 14 is not a predetermined acoustic feature value as "true" and that the synthetic acoustic feature value generated by the acoustic feature value generation unit 14 is a predetermined acoustic feature value as "false." The natural/synthetic voice determination model is optimized simultaneously with the speaker determination model.

The speaker determination model learning unit 16 learns the speaker determination model that determines whether the speaker of the synthetic acoustic feature value is a predetermined speaker or not based on the plurality of acoustic feature values stored in the database and the plurality of synthetic acoustic feature values stored in the database. Note that the plurality of speaker data items stored in the database may not be inputted to the speaker determination model learning unit 16, but the plurality of speaker data items may be inputted as auxiliary feature values.

The speaker determination model learning unit 16 learns the speaker determination model so as to minimize the loss function of the speaker determination model shown in following Formula (8). The speaker determination model learning unit 16 learns the speaker determination model so as to detect arrogation by the acoustic model. Following Formula (9) is a loss function corresponding to the fact that the speaker of the acoustic feature value is not determined to be a predetermined speaker and following Formula (10) is a loss function corresponding to the fact that the speaker of the synthetic acoustic feature value is determined to be a predetermined speaker.

[Formula 8]
Loss Function of Speaker Determination Model:

$$L_{D_{SPK}}(o,\hat{o}) = L_{SPK,1}(o) + L_{SPK,0}(\hat{o}) \tag{8}$$

[Formula 9]
Loss Function Corresponding to Fact that Speaker of Acoustic Feature Value is not Determined to be a Predetermined Speaker:

$$L_{SPK,1}(o) = -\frac{1}{T}\sum_{t=1}^{T} \ln D_{SPK}(o_t) \tag{9}$$

[Formula 10]
Loss Function Corresponding to Fact that Speaker of Synthetic Acoustic Feature Value is Determined to be a Predetermined Speaker:

$$L_{SPK,0}(\hat{o}) = -\frac{1}{T}\sum_{t=1}^{T} \ln(1 - D_{SPK}(\hat{o}_t)) \tag{10}$$

Where, $I_1, \ldots, I_T$ are language feature values, $s_1, \ldots, s_T$ are speaker codes, $o_1, \ldots, o_T$ are acoustic feature values, $\hat{o}_1, \ldots, \hat{o}_T$ ($\hat{o}_t = G(1_t, s_t)$) are synthetic acoustic feature values, t is a frame index and T is a total number of frames.

In the generative adversarial network, the model learning unit 10 learns the acoustic model so that the synthetic acoustic feature value is not determined by the speaker determination model, and therefore "true" means not being determined by the speaker determination model and "false" means being determined by the speaker determination model.

For example, a probability that an input vector x is "true" can be expressed as shown in following Formula (11). The probability that an input vector x is "true" is a probability that the speaker of the synthetic acoustic feature value generated by the acoustic feature value generation unit 14 is not determined by the speaker determination model to be a predetermined speaker within the learning data, that is, a probability that the speaker of the synthetic acoustic feature value is not classified as a K-class determiner.

Therefore, the speaker determination model determines the speaker of the synthetic acoustic feature value by assuming the fact that the speaker of the synthetic acoustic feature value generated by the acoustic feature value generation unit 14 is not determined to be a predetermined speaker within the learning data as "true" and assuming the fact that the speaker of the synthetic acoustic feature value generated by the acoustic feature value generation unit 14 is determined to be a predetermined speaker within the learning data as "false." Furthermore, the speaker determination model is optimized simultaneously with the natural/synthetic voice determination model.

For example, when the number of predetermined speakers within the learning data is K, the speaker determination model is a model that outputs a K (K=the number of speakers) dimensional vector and gives a probability to be determined by K speakers. When the predetermined speakers within the learning data are, for example, three speakers: "speaker A," "speaker B" and "speaker C," the speaker determination model outputs a three-dimensional vector.

[Formula 11]

$$D_{SPK}(x) = \frac{Z(x)}{Z(x)+1} \left( \text{where } Z(x) = \sum_{k=1}^{K} e^{l_k(x)} \right) \quad (11)$$

Where, k is a speaker index and $l_k(\bullet)$ is output of speaker k.

For example, a probability that the input vector x is "false" can be represented by $1-D_{SPK}(x)$. The probability that the input vector x is "false" is a probability that the speaker of the synthetic acoustic feature value generated by the acoustic feature value generation unit 14 is determined by the speaker determination model to be a predetermined speaker within the learning data, that is, a probability that the speaker of the synthetic acoustic feature value is classified as a K-class determiner.

As described above, the model learning unit 10 is provided with the speaker determination model learning unit 16 in addition to the acoustic model learning unit 13 and the natural/synthetic voice determination model learning unit 15, and the model learning unit 10 can thereby learn the acoustic model and the determination model while identifying speakers. Since a synthetic voice generated using this acoustic model is a voice similar to a so-called natural voice with intonation, it is unnecessary to apply separate processing or the like to the voice.

The model learning unit 10 can bring the synthetic acoustic feature value closer to the predetermined acoustic feature value in adversarial learning of a voice determination task and bring the speaker of the synthetic acoustic feature value closer to the predetermined speaker in adversarial learning of a speaker determination task. This makes it possible to avoid the problem that the conventional model learning unit would perform such learning as to bring a synthetic acoustic feature value estimated by an acoustic model closer to an average acoustic feature value of a plurality of speakers (would perform learning without identifying speakers) and achieve the model learning unit 10 that performs learning that clearly reflects speaker characteristics.

[Configuration of Voice Synthesis Unit]

Next, the voice synthesis unit 20 will be described. The voice synthesis unit 20 is provided with a language feature value calculation unit 21, an acoustic feature value generation unit 22, a waveform generation unit 23, a database (not shown) or the like.

The language feature value calculation unit 21 calculates a language feature value based on arbitrary text data. The language feature value is represented by a vector, and examples thereof include phoneme, accent, mora length. For example, the language feature value calculation unit 21 applies text analysis processing such as morpheme analysis to arbitrary text data, extracts a language feature value and stores the language feature value in a database within the voice synthesis unit 20. The arbitrary text data is arbitrarily set by a user who uses the voice synthesis device 100.

The acoustic feature value generation unit 22 generates a synthetic acoustic feature value of a target speaker using the above-described acoustic model based on a language feature value stored in a database within the voice synthesis unit 20 and speaker data of the target speaker stored in the database within the voice synthesis unit 20. The target speaker (e.g., speaker A, speaker B, speaker C) is set arbitrarily by the user who uses the voice synthesis device 100.

The waveform generation unit 23 generates synthetic voice data of the target speaker based on the synthetic acoustic feature value of the target speaker. For example, when the target speaker set by the user is the speaker A, the waveform generation unit 23 generates synthetic voice data of the speaker A. For example, when the target speaker set by the user is the speaker B, the waveform generation unit 23 generates synthetic voice data of the speaker B. For example, when the target speaker set by the user is the speaker C, the waveform generation unit 23 generates synthetic voice data of the speaker C.

Note that in the voice synthesis device 100 shown in FIG. 1, although the model learning unit 10 and the voice synthesis unit 20 are described as separate units, the model learning unit 10 and the voice synthesis unit 20 may be integrally formed. Therefore, the voice synthesis unit 20 may include the respective components provided for the model learning unit 10.

According to the voice synthesis device 100 according to the first embodiment, the model learning unit 10 learns an acoustic model and a determination model while identifying a speaker in addition to whether it is a natural sound or not, and can thereby improve quality of synthetic voice data of the target speaker generated using this acoustic model. That is, it is possible to realize the voice synthesis device 100 capable of generating a high-quality synthetic voice.

According to the voice synthesis device 100 according to the first embodiment, the natural/synthetic voice determination model and the speaker determination model are simultaneously optimized, and so it is possible to stabilize learning of the model learning unit 10 and improve learning accuracy.

The voice synthesis device 100 according to the first embodiment eliminates the necessities for signal processing approach to suppress excessive smoothing of the synthetic acoustic feature value and parameter generation in consideration of an in-sequence fluctuation at the time of voice synthesis in the prior arts. This makes it possible to realize the voice synthesis device 100 with a simple configuration.

Second Embodiment

Figure 2:
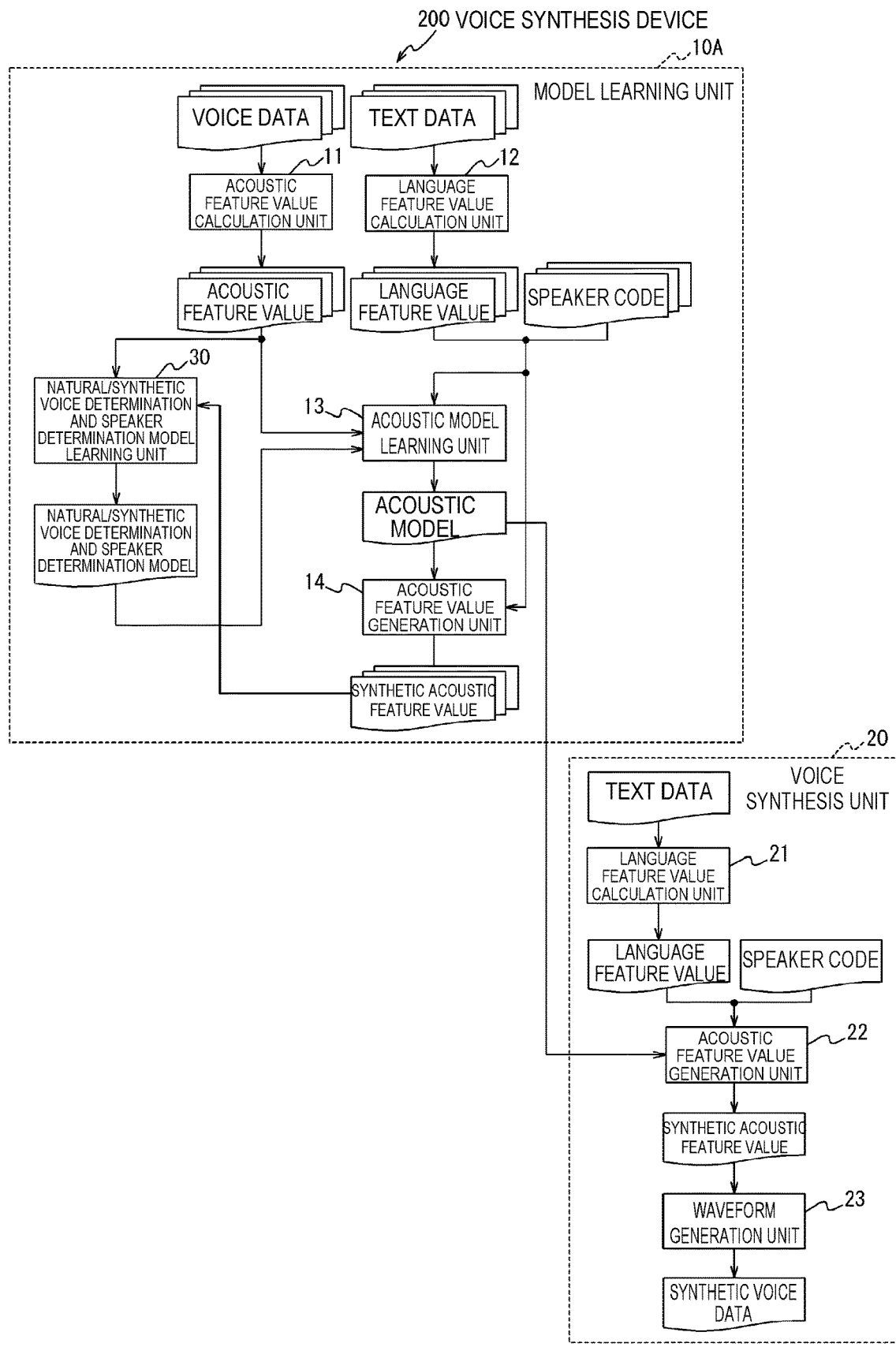
FIG. 2 is a block diagram illustrating an example of a configuration of a voice synthesis device according to a second embodiment of the present invention.

A voice synthesis device 200 according to a second embodiment will be described with reference to FIG. 2. FIG. 2 is a diagram illustrating an example of a configuration of the voice synthesis device 200 according to the second embodiment.

The voice synthesis device 200 according to the second embodiment is different from the voice synthesis device 100 according to the first embodiment in that the model learning unit 10 of the voice synthesis device 100 according to the first embodiment is provided with two determination model learning units: the natural/synthetic voice determination model learning unit 15 and the speaker determination model learning unit 16, whereas a model learning unit 10A in the voice synthesis device 200 according to the second embodiment is provided with one determination model learning unit called a natural/synthetic voice determination and speaker determination model learning unit 30, in which the natural/synthetic voice determination model learning unit 15 and the speaker determination model learning unit 16 are integrated. Note that the rest of the configuration is the same as the configuration of the voice synthesis device 100 according to the first embodiment, and therefore duplicate description will be omitted.

As shown in FIG. 2, the model learning unit 10A is provided with the acoustic feature value calculation unit 11, the language feature value calculation unit 12, the acoustic model learning unit (first learning unit) 13, the acoustic feature value generation unit 14, the natural/synthetic voice determination and speaker determination model learning unit (second learning unit) 30 or the like.

The natural/synthetic voice determination and speaker determination model learning unit 30 learns a natural/synthetic voice determination and speaker determination model that determines whether the synthetic acoustic feature value is an acoustic feature value of a predetermined speaker (acoustic feature value based on natural voice data of a speaker for whom synthetic acoustic feature value is generated) or not, based on a plurality of acoustic feature values stored in a database and a plurality of synthetic acoustic feature values stored in the database. Note that the plurality of speaker data items stored in the database may not be inputted to the natural/synthetic voice determination and speaker determination model learning unit 30 or may be inputted as an auxiliary feature value.

The natural/synthetic voice determination and speaker determination model learning unit 30 learns a natural/synthetic voice determination and speaker determination model so as to minimize a loss function of the natural/synthetic voice determination and speaker determination model shown in following Formula (12). The natural/synthetic voice determination and speaker determination model learning unit 30 learns the natural/synthetic voice determination and speaker determination model so as to detect arrogation by the acoustic model.

[Formula 12]
Loss Function of Natural/Synthetic Voice Determination and Speaker Determination Model:

$$L_{D_{ASV,SPK}}(o, \hat{o}) = L_{D_{ASV}}(o, \hat{o}) + L_{D_{SPK}}(o, \hat{o}) \quad (12)$$

Where, $I_1, \ldots, I_T$ are language feature values, $s_1, \ldots, s_T$ are speaker codes, $o_1, \ldots, o_T$ are acoustic feature values, $\hat{o}_1, \ldots, \hat{o}_T$ ($\hat{o}_t = G(1_L, s_L)$) are synthetic acoustic feature values, t is a frame index and T is a total number of frames.

In the generative adversarial network, the model learning unit 10 learns the acoustic model so that the synthetic acoustic feature value is not determined by the natural/synthetic voice determination and speaker determination model, and therefore "true" means not being determined by the natural/synthetic voice determination and speaker determination model and "false" means being determined by the natural/synthetic voice determination and speaker determination model.

Therefore, the natural/synthetic voice determination and speaker determination model determines the synthetic acoustic feature value and the speaker of the synthetic acoustic feature value by assuming the fact that the synthetic acoustic feature value generated by the acoustic feature value generation unit 14 is not determined to be an acoustic feature value of a predetermined speaker within the learning data as "true" and the fact that the synthetic acoustic feature value generated by the acoustic feature value generation unit 14 is determined to be an acoustic feature value of a predetermined speaker within the learning data as "false." In the natural/synthetic voice determination and speaker determination model, natural/synthetic voice determination and speaker determination are optimized simultaneously.

For example, the natural/synthetic voice determination and speaker determination model may be constructed of one network except an output layer. For example, the natural/synthetic voice determination and speaker determination model may be constructed with one network, which is branched in the middle.

By adopting the natural/synthetic voice determination and speaker determination model in which a natural/synthetic voice determination model and a speaker determination model are integrated for the voice synthesis device 200, it is possible to allow the model learning unit 10A to integrally learn both models using one loss function. The model learning unit 10A learns a plurality of tasks (voice determination task and speaker determination task) simultaneously, and can thereby acquire factors common to the respective tasks, improve prediction accuracy of the respective tasks and stabilize the learning. The model learning unit 10A learns a plurality of tasks (voice determination task and speaker determination task) simultaneously, and can thereby share parameters of both models, and the number of parameters to be estimated decreases, and it is also possible to obtain an effect of the system becoming robust against over-learning or the like.

As described above, the model learning unit 10A is provided with the natural/synthetic voice determination and speaker determination model learning unit 30, and the model learning unit 10A can thereby learn the acoustic model and the determination model while identifying speakers in addition to whether it is a natural sound or not. The synthetic voice generated using this acoustic model is a voice similar to a so-called natural voice with intonation, which eliminates the necessity for applying separate processing or the like to the voice.

The model learning unit 10A can bring a synthetic acoustic feature value closer to a predetermined acoustic feature value in adversarial learning of a voice determination task and bring the speaker of the synthetic acoustic feature value closer to a predetermined speaker in adversarial learning of a speaker determination task. This makes it possible to avoid the problem that the conventional model learning unit would perform learning so as to bring the synthetic acoustic feature value estimated by the acoustic model closer to an average acoustic feature value of the plurality of speakers and realize the model learning unit 10A that conducts learning that clearly reflects speaker characteristics.

According to the voice synthesis device 200 according to the second embodiment, the model learning unit 10A does not learn the natural/synthetic voice determination model and the speaker determination model individually, but learns the natural/synthetic voice determination model integrally with the speaker determination model. The model learning unit 10A learns the acoustic model and natural/synthetic voice determination and the speaker determination model while identifying speakers, and can thereby improve quality of the synthetic voice data of the target speaker generated using the acoustic model. That is, it is possible to realize the voice synthesis device 200 capable of generating a high-quality synthetic voice.

Third Embodiment

Figure 3:
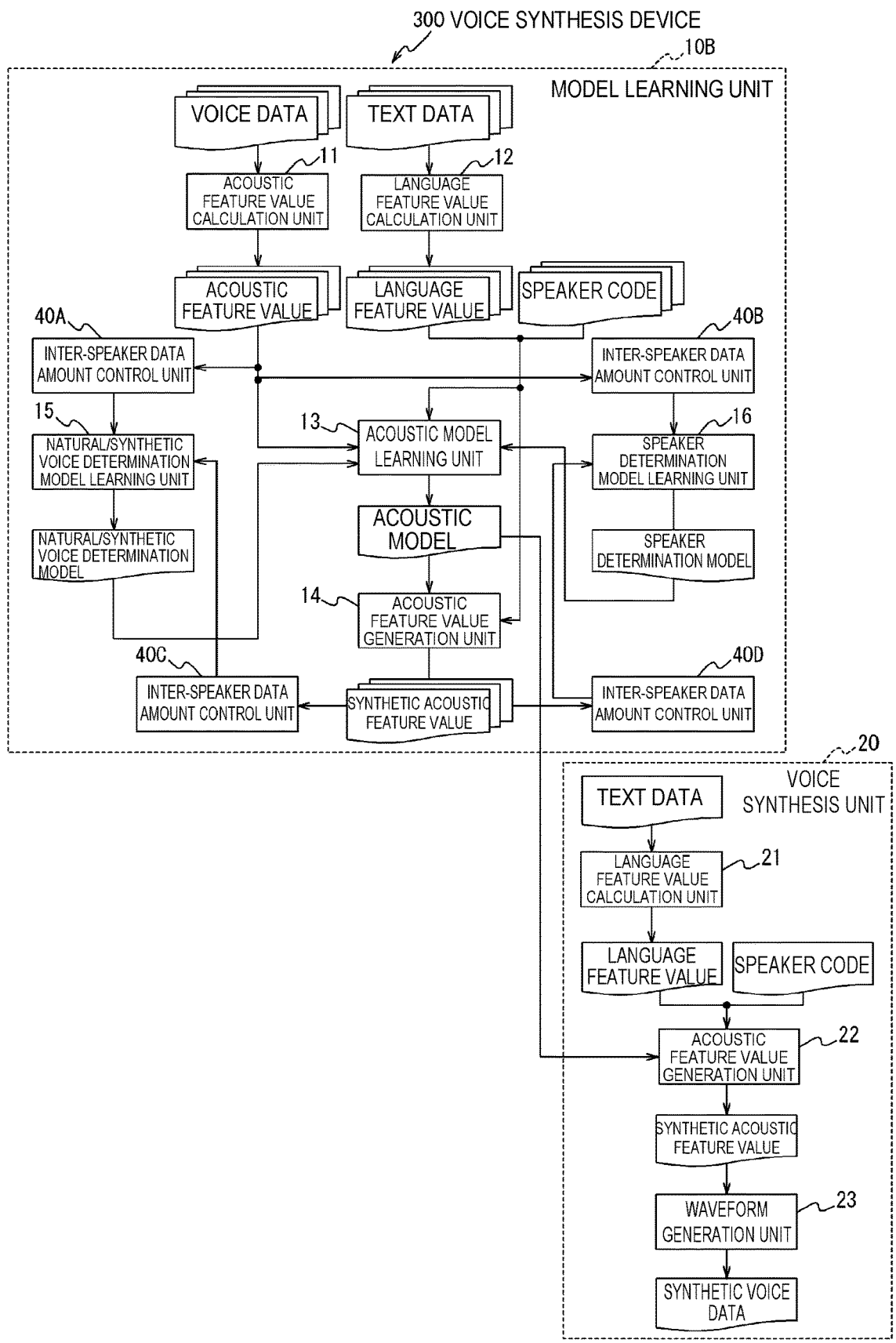
FIG. 3 is a block diagram illustrating an example of a configuration of a voice synthesis device according to a third embodiment of the present invention.

A voice synthesis device 300 according to a third embodiment will be described with reference to FIG. 3. FIG. 3 is a diagram illustrating an example of a configuration of the voice synthesis device 300 according to the third embodiment.

The voice synthesis device 300 according to the third embodiment is different from the voice synthesis device 100 according to the first embodiment in that the model learning unit 10 of the voice synthesis device 100 according to the first embodiment is not provided with any inter-speaker data amount control unit that controls data amounts between speakers, whereas the model learning unit 10B of the voice synthesis device 300 according to the third embodiment is provided with an inter-speaker data amount control unit 40 that controls data amounts between speakers. Note that the rest of the configuration is the same as the configuration of the voice synthesis device 100 according to the first embodiment, and therefore duplicate description will be omitted.

As shown in FIG. 3, a model learning unit 10B is provided with the acoustic feature value calculation unit 11, the language feature value calculation unit 12, the acoustic model learning unit 13, the acoustic feature value generation unit 14, the natural/synthetic voice determination model learning unit 15, the speaker determination model learning unit 16, the inter-speaker data amount control unit (data amount control unit) 40 or the like.

An inter-speaker data amount control unit 40A is disposed between, for example, the acoustic feature value calculation unit 11 and the natural/synthetic voice determination model learning unit 15. An inter-speaker data amount control unit 40B is disposed between, for example, the acoustic feature value calculation unit 11 and the speaker determination model learning unit 16. An inter-speaker data amount control unit 40C is disposed between, for example, the acoustic feature value generation unit 14 and the natural/synthetic voice determination model learning unit 15. An inter-speaker data amount control unit 40D is disposed between, for example, the acoustic feature value generation unit 14 and the speaker determination model learning unit 16. Note that in FIG. 3, the model learning unit 10B will be described by taking a configuration in which the model learning unit 10B is provided with four inter-speaker data amount control units 40 as an example, but the number of inter-speaker data amount control units 40 is not particularly limited.

The inter-speaker data amount control unit 40A controls, for example, data amounts of a plurality of acoustic feature values extracted from natural voice data (learning data) of a plurality of speakers inputted to the natural/synthetic voice determination model learning unit 15. The inter-speaker data amount control unit 40A controls acoustic feature values corresponding to the respective speakers so as to make differences in data amounts generated among speakers uniform and outputs the acoustic feature values to the natural/synthetic voice determination model learning unit 15.

The inter-speaker data amount control unit 40B controls, for example, data amounts of the plurality of acoustic feature values extracted from the natural voice data (learning data) of the plurality of speakers inputted to the speaker determination model learning unit 16. The inter-speaker data amount control unit 40B controls the acoustic feature values corresponding to the respective speakers so as to make differences in data amounts generated among speakers uniform and outputs the acoustic feature values to the speaker determination model learning unit 16.

The inter-speaker data amount control unit 40C controls, for example, data amounts of a plurality of synthetic acoustic feature values generated by the acoustic feature value generation unit 14 inputted to the natural/synthetic voice determination model learning unit 15. The inter-speaker data amount control unit 40C controls synthetic acoustic feature values corresponding to the respective speakers so as to make differences in data amounts generated among speakers uniform and outputs the synthetic acoustic feature values to the natural/synthetic voice determination model learning unit 15.

The inter-speaker data amount control unit 40D controls data amounts of a plurality of synthetic acoustic feature values generated by the acoustic feature value generation unit 14 inputted, for example, to the speaker determination model learning unit 16. The inter-speaker data amount control unit 40D controls synthetic acoustic feature values corresponding to the respective speakers so as to make differences in data amounts generated among speakers uniform and outputs the synthetic acoustic feature values to the speaker determination model learning unit 16.

The model learning unit 10B is provided with the inter-speaker data amount control unit 40, and the model learning unit 10B can learn the acoustic model, the natural/synthetic voice determination model and the speaker determination model with differences in data amounts generated among the plurality of speakers made uniform. Thus, even when differences in data amounts generated among the plurality of speakers are extremely large, the model learning unit 10B can perform uniform learning for the respective speakers without performing learning specialized for speakers with large data amounts. Therefore, it is possible to stabilize the learning of the model learning unit 10B and improve learning accuracy.

Since the model learning unit 10B is provided with the speaker determination model learning unit 16 in addition to the acoustic model learning unit 13 and the natural/synthetic voice determination model learning unit, the model learning unit 10B can learn the acoustic model and the determination model while identifying the speakers. Since the synthetic voice generated using this acoustic model is a voice similar to a so-called natural voice with intonation, it is unnecessary to apply separate processing or the like to the voice.

According to the voice synthesis device 300 according to the third embodiment, the model learning unit 10B learns the acoustic model and the determination model while identifying the speakers in addition to whether it is a natural sound or not, and can thereby improve quality of the synthetic voice data of the target speaker generated using this acoustic model. That is, it is possible to realize the voice synthesis device 300 capable of generating a high-quality synthetic voice.

Fourth Embodiment

Figure 4:
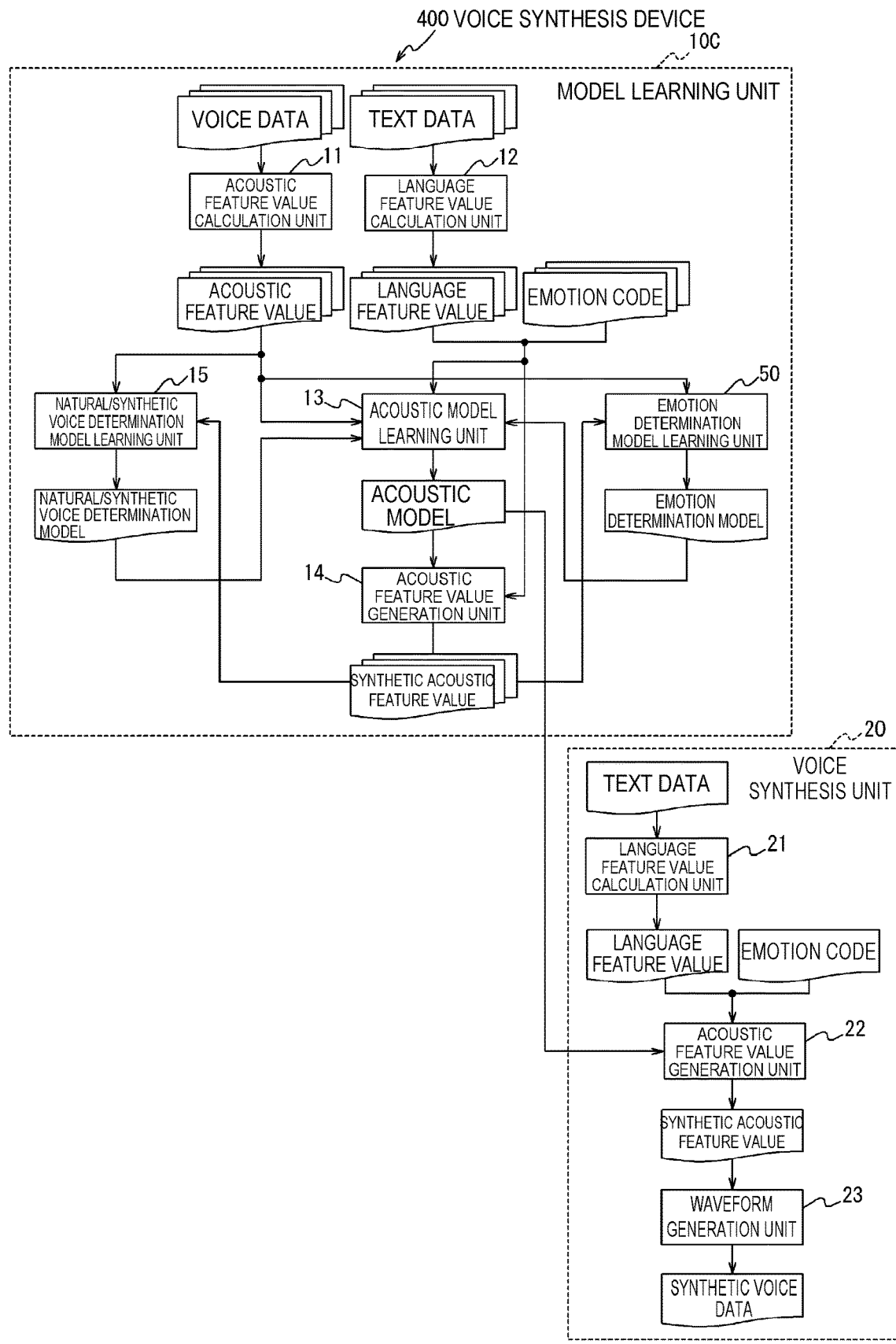
FIG. 4 is a block diagram illustrating an example of a configuration of a voice synthesis device according to a fourth embodiment of the present invention.
Figure 5:
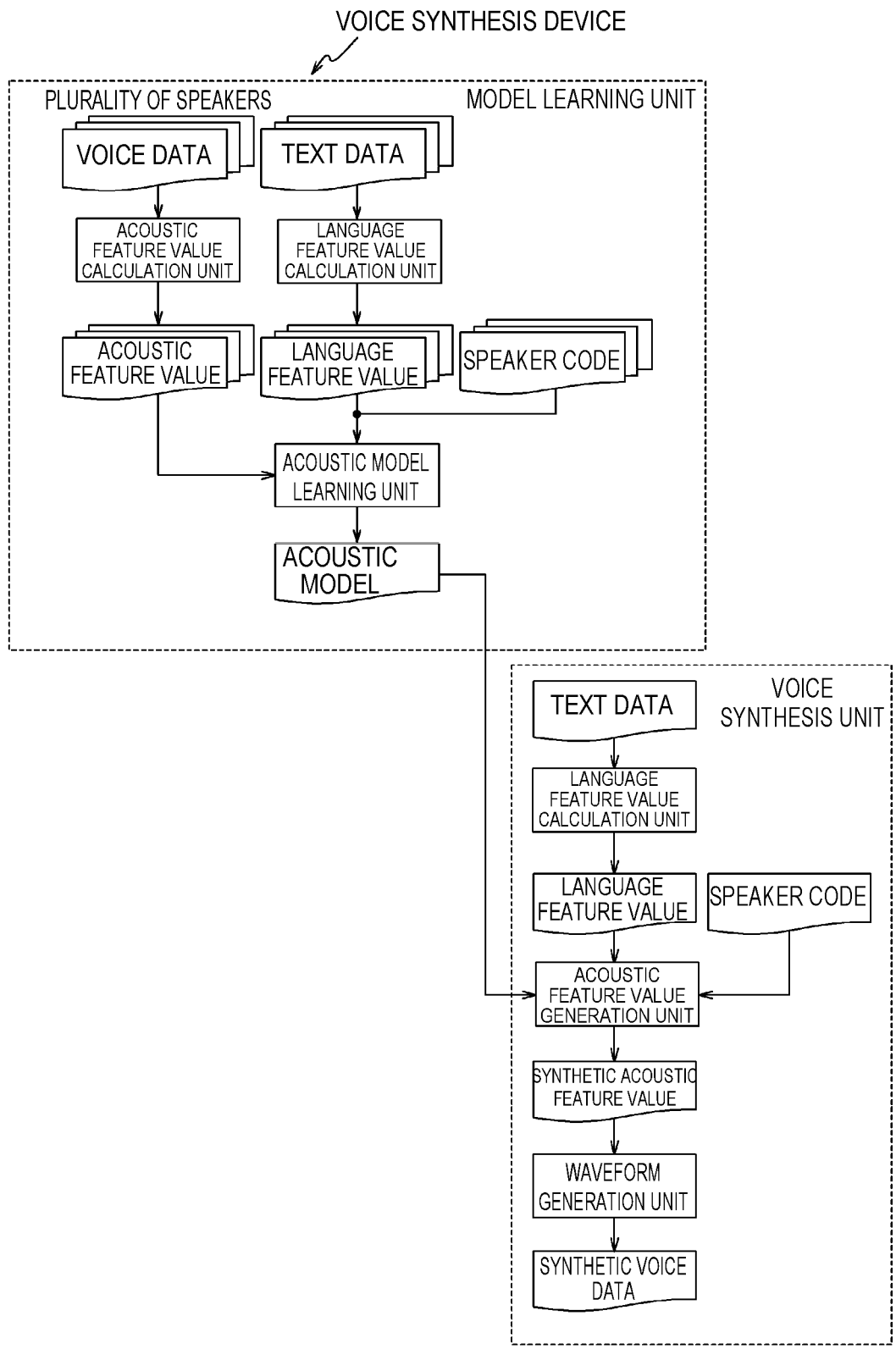
FIG. 5 is a block diagram illustrating an example of a configuration of a conventional voice synthesis device.
Figure 6:
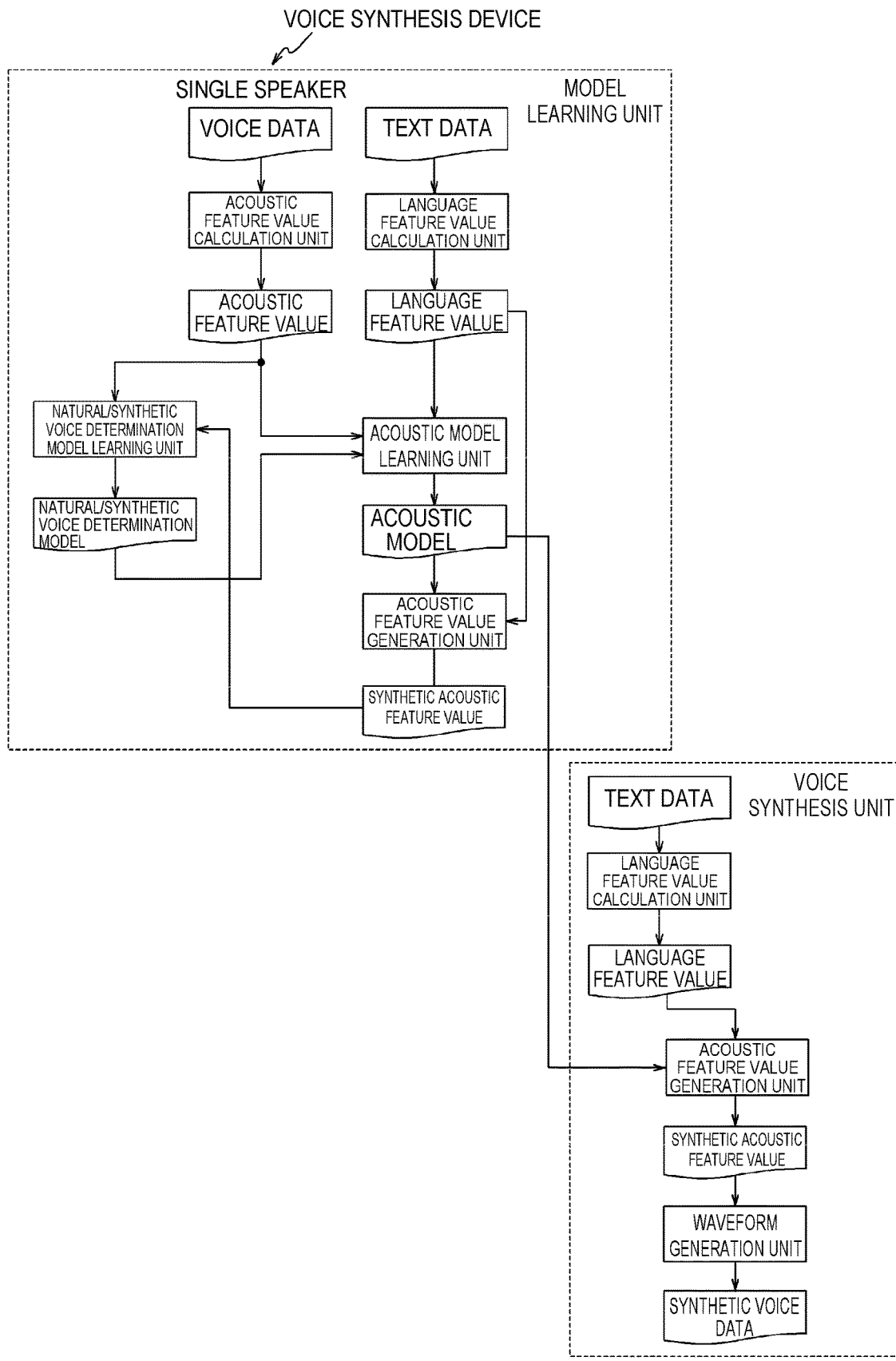
FIG. 6 is a block diagram illustrating an example of a configuration of a conventional voice synthesis device.

A voice synthesis device 400 according to a fourth embodiment will be described with reference to FIG. 4. FIG. 4 is a diagram illustrating an example of a configuration of the voice synthesis device 400 according to the fourth embodiment.

The voice synthesis device 400 according to the fourth embodiment is different from the voice synthesis device 100 according to the first embodiment in that the model learning unit 10 of the voice synthesis device 100 according to the first embodiment is provided with two determination model learning units: the natural/synthetic voice determination model learning unit 15 and the speaker determination model learning unit 16, whereas a model learning unit 10C in the voice synthesis device 400 according to the fourth embodiment is provided with two determination model learning units: the natural/synthetic voice determination model learning unit 15 and an emotion determination model learning unit 50. That is, the voice synthesis device 400 according to the fourth embodiment is provided with the emotion determination model learning unit 50 instead of the speaker determination model learning unit 16 provided for the voice synthesis device 100 according to the first embodiment. Note that the rest of the configuration is the same as the configuration of the voice synthesis device 100 according to the first embodiment, and therefore duplicate description will be omitted.

The model learning unit 10C provided for the voice synthesis device 400 according to the fourth embodiment learns the acoustic model and the determination model while identifying emotion. Therefore, the voice synthesis device 400 according to the fourth embodiment is particularly useful when a plurality of natural voice data items of the same speaker with different emotional expressions are used as learning data.

As shown in FIG. 4, the voice synthesis device 400 is provided with the model learning unit 10C and the voice synthesis unit 20. The model learning unit 10C alternately learns an acoustic model and a determination model via a generative adversarial network using natural voice data of a plurality of speakers, a plurality of text data items corresponding to natural voice data of the plurality of speakers and a plurality of emotion data items or the like as learning data. The voice synthesis unit 20 generates synthetic voice data indicating target emotion (emotion for which synthetic voice data is generated) from arbitrary text data using the acoustic model.

The emotion data is represented by a vector, and an example of the emotion data is an emotion code. The emotion code can be represented by a J (J=the number of emotions) dimensional vector expressing a certain element with 1 and another element with 0. Examples of emotion elements include "joy," "sadness," "anger," "resignation", "surprise," "disgust" and "fear."

[Configuration of Model Learning Unit]

First, the model learning unit 10C will be described. The model learning unit 10C is provided with the acoustic feature value calculation unit 11, the language feature value calculation unit 12, the acoustic model learning unit 13, the acoustic feature value generation unit 14, the natural/synthetic voice determination model learning unit 15, the emotion determination model learning unit 50, a database (not shown) or the like.

The emotion determination model learning unit 50 learns an emotion determination model that determines whether the emotion of the synthetic acoustic feature value is a predetermined emotion (speaker for whom a synthetic acoustic feature value is generated) or not based on a plurality of acoustic feature values stored in the database and a plurality of synthetic acoustic feature values stored in a database. Note that the plurality of emotion data items stored in the database may not be inputted to the emotion determination model learning unit 50 or may be inputted as an auxiliary feature value.

The emotion determination model learning unit 50 learns the emotion determination model so as to minimize a loss function of an emotion determination model shown in following Formula (13). The emotion determination model learning unit 50 learns the emotion determination model so as to detect arrogation by the acoustic model. Following Formula (14) is a loss function corresponding to the fact that an emotion of the acoustic feature value is not determined to express a predetermined emotion and following Formula (15) is a loss function corresponding to the fact that the emotion of the synthetic acoustic feature value is determined to express a predetermined emotion.

[Formula 13]
Loss Function of Emotion Determination Model:

$$L_{D_{EMO}}(o,\hat{o}) = L_{EMO,1}(o) + L_{EMO,0}(\hat{o}) \quad (13)$$

[Formula 14]
Loss Function Corresponding to Fact that Emotion of Acoustic Feature Value is not Determined to Express Predetermined Emotion:

$$L_{EMO,1}(o) = -\frac{1}{T}\sum_{t=1}^{T} \ln D_{EMO}(o_t) \quad (14)$$

[Formula 15]
Loss Function Corresponding to Fact that Emotion of Acoustic Feature Value is Determined to Express Predetermined Emotion:

$$L_{EMO,0}(\hat{o}) = -\frac{1}{T}\sum_{t=1}^{T} \ln(1 - D_{EMO}(\hat{o}_t)) \quad (15)$$

Where, $I_1, \ldots, I_T$ are language feature values, $s_1, \ldots, s_T$ are speaker codes, $o_1, \ldots, o_T$ are acoustic feature values, $\hat{o}_1, \ldots, \hat{o}_T$ ($\hat{o}_t = G(1_t, s_t)$) are synthetic acoustic feature values, t is a frame index and T is a total number of frames.

In the generative adversarial network, the model learning unit 100 learns the acoustic model so that the synthetic acoustic feature value is not determined by the emotion determination model, and therefore "true" means not being determined by the emotion determination model and "false" means being determined by the emotion determination model.

Therefore, the emotion determination model is a model that determines the emotion of the synthetic acoustic feature value by assuming the fact that the emotion of the synthetic acoustic feature value generated by the acoustic feature value generation unit 14 is not determined to be a predetermined emotion within the learning data as "true" and assuming the fact that the emotion of the synthetic acoustic feature value generated by the acoustic feature value generation unit 14 is determined to be a predetermined emotion within the learning data as "false." The emotion determination model is optimized simultaneously with the natural/synthetic voice determination model.

For example, when the number of predetermined emotions within learning data is J, the emotion determination model is a model that outputs a J (=the number of emotions) dimensional vector and gives a probability of being determined to be one of J emotions. When a predetermined emotion within the learning data is, for example, 7 emotions of "joy," "sadness," "anger," "resignation", "surprise," "disgust" and "fear," the emotion determination model outputs a 7-dimensional vector.

For example, a probability that an input vector x is "true" can be expressed as shown in following Formula (16).

The probability that an input vector x is "true" is a probability that the emotion of the synthetic acoustic feature value generated by the acoustic feature value generation unit 14 is not determined by the emotion determination model to be a predetermined emotion within the learning data, that is, a probability that the emotion of the synthetic acoustic feature value is not classified as a J-class determiner. [Formula 16]

$$D_{EMO}(x) = \frac{Z(x)}{Z(x)+1} \left( \text{where } Z(x) = \sum_{j=1}^{J} e^{l_j(x)} \right) \quad (16)$$

Where, j is an emotion index and $l_j(\cdot)$ is output of emotion j.

For example, a probability that the input vector x is "false" can be represented by $1-D_{EMO}(x)$. The probability that the input vector x is "false" is a probability that the emotion of the synthetic acoustic feature value generated by the acoustic feature value generation unit 14 is determined by the emotion determination model to be a predetermined emotion within the learning data, that is, a probability that the emotion of the synthetic acoustic feature value is classified as a J-class determiner.

Note that in the voice synthesis device 400 according to the fourth embodiment, as in the case of the voice synthesis device 200 according to the second embodiment, the emotion determination model may be integrated with the natural/synthetic voice determination model so as to enable the model learning unit 10C to learn a plurality of tasks simultaneously. By combining the emotion determination model according to the voice synthesis device 400 according to the fourth embodiment with the model provided for the voice synthesis device 100 according to the first embodiment, the model provided for the voice synthesis device 200 according to the second embodiment and the model provided for the voice synthesis device 300 according to the third embodiment as appropriate, it is also possible to further add the emotion determination model to the models of the respective embodiments.

As described above, the model learning unit 10C is provided with the emotion determination model learning unit 50 in addition to the acoustic model learning unit 13 and the natural/synthetic voice determination model learning unit, and the model learning unit 10C can thereby learn the acoustic model and the determination model while identifying the emotion. The synthetic voice generated using this acoustic model is a voice similar to a so-called natural voice with intonation, which eliminates the necessity for applying separate processing or the like to the voice.

The model learning unit 10C can bring a synthetic acoustic feature value closer to a predetermined acoustic feature value in adversarial learning of a voice determination task and bring the emotion of the synthetic acoustic feature value closer to a predetermined emotion in adversarial learning of an emotion determination task. This makes it possible to avoid the problem that the conventional model learning unit would perform learning so as to bring the synthetic acoustic feature value estimated by the acoustic model closer to an average acoustic feature value extracted from the plurality of natural voice data items with different emotional expressions and realize the model learning unit 100 that conducts learning that clearly reflects emotional expressions.

[Configuration of Voice Synthesis Unit]

Next, the voice synthesis unit 20 will be described. The voice synthesis unit 20 is provided with the language feature value calculation unit 21, the acoustic feature value generation unit 22, the waveform generation unit 23, a database (not shown) or the like.

The language feature value calculation unit 21 calculates a language feature value based on arbitrary text data. The language feature value is represented by a vector and examples thereof include phoneme, accent and mora length. For example, the language feature value calculation unit 21 applies text analysis processing such as morpheme analysis to arbitrary text data, extracts a language feature value and stores the language feature value in the database in the voice synthesis unit 20. The arbitrary text data is arbitrarily set by a user who uses the voice synthesis device 100.

Using the above-described acoustic model, the acoustic feature value generation unit 22 generates a synthetic acoustic feature value indicating a target emotion based on the language feature value stored in the database in the voice synthesis unit 20 and emotion data indicating the target emotion stored in the database in the voice synthesis unit 20. The target emotions (e.g., "joy," "sadness," "anger," "resignation", "surprise," "disgust" and "fear") are arbitrarily set by a user who uses the voice synthesis device 400.

The waveform generation unit 23 generates synthetic voice data indicating a target emotion based on the synthetic acoustic feature value indicating the target emotion. For example, when the target emotion set by the user is "joy," the waveform generation unit 23 generates synthetic voice data indicating "joy." For example, when the target emotion set by the user is "sadness," the waveform generation unit 23 generates synthetic voice data indicating "sadness."

According to the voice synthesis device 400 according to the fourth embodiment, the model learning unit 10C learns the acoustic model and the determination model while identifying an emotion in addition to whether it is a natural sound or not, and can thereby improve quality of synthetic voice data indicating the target emotion generated using this acoustic model. That is, it is possible to realize the voice synthesis device 400 capable of generating a high-quality synthetic voice.

According to the voice synthesis device 400 according to the fourth embodiment, even when the model learning unit 10C is caused to learn models mixed with emotional expressions which are different utterance modes, it is possible to generate a synthetic voice that clearly reflects emotional expressions without deteriorating learning performance.

<Modifications>

The determination model applied to the voice synthesis device according to the present embodiment is not limited to the speaker determination model. For example, it is also possible to adopt an age determination model assuming a case where a plurality of natural voice data items with different expressions depending on the age of a speaker is used as learning data. For example, a sex determination model assuming a case where a plurality of natural voice data (mixed gender data) items with different expressions depending on the sex of a speaker are used as learning data can also be adopted. Any model can be adopted if it can determine the target using an arbitrary reference.

<Other Modifications>

The present invention is not limited to the above embodiments and modifications. For example, the above-described various processes may be executed not only time-sequentially in the described order but also in parallel or individually according to the processing capacity of the devices executing the processes or as required. In addition, the processes can be changed as appropriate without departing from the spirit of the present invention.

<Program and Recording Medium>

The various processing function in the respective devices described in the above embodiments and modifications may be implemented by a computer. In that case, processing contents of the functions to be possessed by the respective devices are written by a program. By the computer executing the program, the various processing functions in the respective devices are implemented on the computer.

The program that describes the processing contents can be recorded in a computer-readable recording medium. Examples of the computer-readable recording medium include a magnetic recording apparatus, an optical disk, a magneto-optical recording medium, a semiconductor memory or any medium.

This program is circulated, for example, by selling, transferring, or lending a portable recording medium such as a DVD or CD-ROM that records the program. It may also be possible to circulate this program by storing this program in a storage device of a server computer and transferring the program from the server computer to other computers via a network.

The computer that executes such a program first stores, for example, a program recorded in a portable recording medium or a program transferred from the server computer in the own storage device temporarily. At the time of execution of a process, this computer reads the program stored in the own storage device and executes the process according to the read program. As another mode of execution of the program, the computer may read the program directly from the portable recording medium and execute a process according to the program. Furthermore, every time the program is transferred to the computer from the server computer, processes may be executed successively according to the received program. The above-described process may be executed by a so-called ASP (application service provider) type service in which without the server computer transferring the program to the computer, the processing function is implemented only by instructing execution and acquiring results thereof. Note that the program includes a semi-program which is information used for processing by a computer (data which is not a direct instruction on the computer but has a characteristic of defining processing of the computer).

Although the respective devices have been configured by causing a computer to execute a predetermined program, at least some of the processing contents may be implemented by hardware.

Although the above embodiments have been described as representative examples, it is obvious to those skilled in the art that many changes and substitutions can be made without departing from the spirit and scope of the present invention. Therefore, the present invention should not be interpreted as being limited by the above-described embodiments, but various modifications and changes are possible without departing from the scope of claims of the present invention. For example, the plurality of configuration blocks described in the block diagrams of the embodiments may be combined into one block or one configuration block may be divided.

REFERENCE SIGNS LIST 10 model learning unit
11 acoustic feature value calculation unit
12 language feature value calculation unit
13 acoustic model learning unit (first learning unit)
14 acoustic feature value generation unit
15 natural/synthetic voice determination model learning unit (second learning unit)
16 speaker determination model learning unit (third learning unit)
20 voice synthesis unit
21 language feature value calculation unit
22 acoustic feature value generation unit (generation unit)
23 waveform generation unit
30 natural/synthetic voice determination and speaker determination model learning unit (second learning unit)
40A inter-speaker data amount control unit (data amount control unit)
40B inter-speaker data amount control unit (data amount control unit)
40C inter-speaker data amount control unit (data amount control unit)
40D inter-speaker data amount control unit (data amount control unit)
50 emotion determination model learning unit (second learning unit)
100 voice synthesis device
200 voice synthesis device
300 voice synthesis device
400 voice synthesis device

The invention claimed is:

1. An acoustic model learning device comprising:
a first learning unit configured to perform adversarial learning of an acoustic model to estimate a plurality of synthetic acoustic feature values using a voice determination model and a speaker determination model based on a plurality of natural acoustic feature values of a plurality of speakers, a plurality of language feature values corresponding to the plurality of natural acoustic feature values, and a plurality of speaker data items indicating to which speakers the respective natural acoustic feature values correspond, the voice determination model determining whether a given acoustic feature value is a natural acoustic feature value or a synthetic acoustic feature value and the speaker determination model determining whether a speaker of the given acoustic feature value is any or none of the plurality of speakers;
a second learning unit configured to perform adversarial learning of the voice determination model based on the plurality of natural acoustic feature values and the plurality of synthetic acoustic feature values; and
a third learning unit configured to perform adversarial learning of the speaker determination model based on the plurality of natural acoustic feature values and the plurality of synthetic acoustic feature values.

2. The acoustic model learning device according to claim 1, wherein
the first learning unit learns the acoustic model so as to minimize a loss function of the acoustic model,
the second learning unit learns the voice determination model so as to minimize a loss function of the voice determination model, and
the third learning unit learns the speaker determination model so as to minimize a loss function of the speaker determination model.

3. The acoustic model learning device according to claim 1, wherein the voice determination model and the speaker determination model are optimized simultaneously.

4. The acoustic model learning device according to claim 1, further comprising a data amount control unit configured to make differences in data amounts generated among the plurality of speakers uniform.

5. A voice synthesis device that synthesizes voice data including features of a desired speaker, comprising:
the acoustic model learning device according to claim 1; and
a synthesis unit configured to synthesize, from text data and speaker data representing the desired speaker, synthetic voice data, which is voice data corresponding to the text data and including the features of the desired speaker, wherein the synthetic voice data is determined by a predetermined determiner to be a natural sound and a voice uttered by the desired speaker.

6. An acoustic model learning device comprising:
a first learning unit configured to perform adversarial learning of an acoustic model to estimate a plurality of synthetic acoustic feature values using a voice determination model and an emotion determination model based on a plurality of natural acoustic feature values of a plurality of emotions, a plurality of language feature values corresponding to the plurality of natural acoustic feature values, and a plurality of emotion data items indicating to which emotions the respective natural acoustic feature values correspond, the voice determination model determining whether a given acoustic feature value is a natural acoustic feature value or a synthetic acoustic feature value and the emotion determination model determining whether an emotion of the given acoustic feature value is any or none of the plurality of emotions;
a second learning unit configured to perform adversarial learning of the voice determination model based on the plurality of natural acoustic feature values and the plurality of synthetic acoustic feature values; and
a third learning unit configured to perform adversarial learning of the emotion determination model based on the plurality of natural acoustic feature values and the plurality of synthetic acoustic feature values.

7. A non-transitory computer readable medium storing a program for causing a computer to function as the acoustic model learning device according to claim 1.

8. A non-transitory computer readable medium storing a program for causing a computer to function as the acoustic model learning device according to claim 6.

9. The acoustic model learning device according to claim 1, wherein the adversarial learning of the acoustic model by the first learning unit and the adversarial learning of the voice and speaker determination models by the second and third learning units are alternately performed using a generative adversarial network.

10. The acoustic model learning device according to claim 9, wherein the first learning unit is configured to perform the adversarial learning of the acoustic model using the voice determination model and the speaker determination model so as to minimize a loss function of the acoustic model that increases as a synthetic acoustic feature value estimated by the acoustic model is determined by the voice determination model to be a synthetic acoustic feature value or as a speaker of a synthetic acoustic feature value estimated by the acoustic model is determined by the speaker determination model to be none of the plurality of speakers.

11. The acoustic model learning device according to claim 10, wherein the loss function of the acoustic model is $$L'_G(o, ô) = MSE(o, ô) + w_D \frac{E_{MSE}}{E_{ASV} + E_{SPK}} \{L_{ASV,1}(ô) + L_{SPK,1}(ô)\}$$

where $I_1, \ldots I_T$ are language feature values, $s_1, \ldots, s_T$ are speaker data items, $o_1, \ldots, o_T$ or are natural acoustic feature values, $ô_1, \ldots, ô_T$ ($ô_t=G(I_t, s_t)$) are synthetic acoustic feature values, t is a frame index, T is a total number of frames, $w_D$ is a hyper parameter of adversarial learning, $MSE(o, ô)$ is a loss function by a squared mean error, $L_{ASV,1}(ô)$ is a loss function corresponding to a natural voice, $L_{SPK,1}(ô)$ is a loss function corresponding to an event that a speaker of a synthetic acoustic feature value is not determined to be a predetermined speaker, and $E_{MSE}$, $E_{ASV}$, and $E_{SPK}$ are expected values of learning 1 iteration of $MSE(o, ô)$, $L_{ASV,1}(ô)$, and $L_{SPK,1}(ô)$, respectively.

12. The acoustic model learning device according to claim 10, wherein the second learning unit is configured to perform the adversarial learning of the voice determination model so as to minimize a loss function of the voice determination model that increases as a synthetic acoustic feature value estimated by the acoustic model is determined by the voice determination model to be a natural acoustic feature value.

13. The acoustic model learning device according to claim 12, wherein the loss function of the voice determination model is $$L_{D_{ASV}}(o,ô)=L_{ASV,1}(o)+L_{ASV,0}(ô)$$

where $I_1, \ldots, I_T$ are language feature values, $s_1, \ldots s_T$ are speaker data items, $o_1, \ldots, o_T$ are natural acoustic feature values, $ô_1, \ldots, ô_T$ ($ô_t=G(I_t, s_t)$) are synthetic acoustic feature values, t is a frame index, T is a total number of frames, $L_{ASV,1}(o)$ is a loss function corresponding to a natural voice, and $L_{ASV,0}(ô)$ is a loss function corresponding to a synthetic voice.

14. The acoustic model learning device according to claim 12, wherein the third learning unit is configured to perform the adversarial learning of the speaker determination model so as to minimize a loss function of the speaker determination model that increases as a speaker of a synthetic acoustic feature value estimated by the acoustic model is determined by the speaker determination model to be any of the plurality of speakers.

15. The acoustic model learning device according to claim 14, wherein the loss function of the speaker determination model is $$L_{D_{SPK}}(o,ô)=L_{SPK,1}(o)+L_{SPK,0}(ô)$$

where $I_1, \ldots I_T$ are language feature values, $s_1, \ldots, s_T$ r are speaker data items, $o_1, \ldots, o_T$ are natural acoustic feature values, $ô_1, \ldots, ô_T$ ($ô_t=G(I_t, s_t)$) are synthetic acoustic feature values, t is a frame index, T is a total number of frames, $L_{SPK,1}(o)$ is a loss function corresponding to an event that a speaker of a natural acoustic feature value is not determined to be a predetermined speaker, and $L_{SPK,0}(ô)$ is a loss function corresponding to an event that a speaker of a synthetic acoustic feature value is determined to be a predetermined speaker.

16. The acoustic model learning device according to claim 1, further comprising a language feature value calculation unit configured to apply text analysis processing to text data to extract the plurality of language feature values.

17. The acoustic model learning device according to claim 6, wherein the adversarial learning of the acoustic model by the first learning unit and the adversarial learning of the voice and emotion determination models by the second and third learning units are alternately performed using a generative adversarial network.

18. The acoustic model learning device according to claim 17, wherein the first learning unit is configured to perform the adversarial learning of the acoustic model using the voice determination model and the emotion determination model so as to minimize a loss function of the acoustic model that increases as a synthetic acoustic feature value estimated by the acoustic model is determined by the voice determination model to be a synthetic acoustic feature value or as an emotion of a synthetic acoustic feature value estimated by the acoustic model is determined by the emotion determination model to be none of the plurality of emotions.

19. The acoustic model learning device according to claim 18, wherein the second learning unit is configured to perform the adversarial learning of the voice determination model so as to minimize a loss function of the voice determination model that increases as a synthetic acoustic feature value estimated by the acoustic model is determined by the voice determination model to be a natural acoustic feature value.

20. The acoustic model learning device according to claim 19, wherein the third learning unit is configured to perform the adversarial learning of the emotion determination model so as to minimize a loss function of the emotion determination model that increases as an emotion of a synthetic acoustic feature value estimated by the acoustic model is determined by the emotion determination model to be any of the plurality of emotions.

* * * * *